United States Patent
Kenney et al.

(10) Patent No.: US 12,320,993 B2
(45) Date of Patent: Jun. 3, 2025

(54) HIGH TRANSMISSION LIGHT CONTROL FILMS WITH ASYMMETRIC LIGHT OUTPUT

(71) Applicant: 3M INNOVATIVE PROPERTIES COMPANY, St. Paul, MN (US)

(72) Inventors: Raymond J. Kenney, Woodbury, MN (US); Owen M. Anderson, Minneapolis, MN (US); Kevin W. Gotrik, Hudson, WI (US); Nicholas A. Johnson, Burnsville, MN (US); Kenneth A. P. Meyer, Eagan, MN (US); Caleb T. Nelson, Woodbury, MN (US); Daniel J. Schmidt, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 709 days.

(21) Appl. No.: 17/596,301

(22) PCT Filed: Jun. 11, 2020

(86) PCT No.: PCT/IB2020/055504
§ 371 (c)(1),
(2) Date: Dec. 7, 2021

(87) PCT Pub. No.: WO2020/250180
PCT Pub. Date: Dec. 17, 2020

(65) Prior Publication Data
US 2022/0221624 A1   Jul. 14, 2022

Related U.S. Application Data

(60) Provisional application No. 62/860,350, filed on Jun. 12, 2019.

(51) Int. Cl.
*G02B 5/00*   (2006.01)
*G02B 5/30*   (2006.01)

(52) U.S. Cl.
CPC ............ *G02B 5/003* (2013.01); *G02B 5/305* (2013.01); *G02B 2207/123* (2013.01)

(58) Field of Classification Search
CPC ... G02B 5/003; G02B 5/305; G02B 2207/123
See application file for complete search history.

(56) References Cited

U.S. PATENT DOCUMENTS

| | | |
|---|---|---|
| 3,524,789 A | 8/1970 | Olsen |
| 4,601,861 A | 7/1986 | Pricone |

(Continued)

FOREIGN PATENT DOCUMENTS

| | | |
|---|---|---|
| JP | 2004062084 A | 2/2004 |
| JP | 2014235397 A | 12/2014 |

(Continued)

OTHER PUBLICATIONS

Krogman, "Automated Process for Improved Uniformity and Versatility of Layer-by-Layer Deposition", Langmuir 2007, vol. 23, No. 6, pp. 3137-3141.

(Continued)

*Primary Examiner* — Anne M Hines
(74) *Attorney, Agent, or Firm* — Robert S. Moshrefzadeh

(57) ABSTRACT

Light control films comprise a light input surface and a light output surface opposite the light input surface and alternating transmissive regions and absorptive regions disposed between the light input surface and the light output surface. The absorptive regions have an aspect ratio of at least 30 and are canted in the same direction. The alternating transmissive regions and absorbing regions have a maximum relative transmission at a viewing angle other than 0 degrees.

19 Claims, 8 Drawing Sheets

(56) References Cited

U.S. PATENT DOCUMENTS

| | | |
|---|---|---|
| 5,486,949 A | 1/1996 | Schrenk |
| 5,612,820 A | 3/1997 | Schrenk |
| 5,783,120 A | 7/1998 | Ouderkirk |
| 5,825,543 A | 10/1998 | Ouderkirk |
| 5,828,488 A | 10/1998 | Ouderkirk |
| 5,830,376 A | 11/1998 | Bohlke |
| 5,882,774 A | 3/1999 | Jonza |
| 6,111,696 A | 8/2000 | Allen |
| 6,285,001 B1 | 9/2001 | Fleming |
| 6,398,370 B1 | 6/2002 | Chiu |
| 6,531,230 B1 | 3/2003 | Weber |
| 7,018,713 B2 | 3/2006 | Padiyath |
| 7,140,741 B2 | 11/2006 | Fleming |
| 7,173,778 B2 | 2/2007 | Jing |
| 7,267,850 B2 | 9/2007 | Coggio |
| 7,467,873 B2 | 12/2008 | Clarke |
| 7,486,019 B2 | 2/2009 | Padiyath |
| 7,575,847 B2 | 8/2009 | Jing |
| 8,012,567 B2 | 9/2011 | Gaides |
| 8,013,567 B2 | 9/2011 | Windsor |
| 8,213,082 B2 | 7/2012 | Gaides |
| 8,234,998 B2 | 8/2012 | Krogman |
| 8,313,798 B2 | 11/2012 | Nogueira |
| 8,460,568 B2 | 6/2013 | David |
| 8,503,122 B2 | 8/2013 | Liu |
| 9,335,449 B2 | 5/2016 | Gaides |
| 9,519,080 B2 | 12/2016 | Cok |
| 9,740,018 B1 | 8/2017 | Ouderkirk |
| 2010/0021450 A1 | 1/2010 | Donovan |
| 2010/0214506 A1 | 8/2010 | Gaides |
| 2010/0271721 A1 | 10/2010 | Gaides |
| 2011/0064936 A1 | 3/2011 | Hammond-Cunningham |
| 2014/0204464 A1 | 7/2014 | Halverson |
| 2015/0109674 A1 | 4/2015 | Cok |
| 2016/0012412 A1 | 5/2016 | Vasylyev |
| 2016/0124126 A1* | 5/2016 | Vasylyev ............... G02B 5/003 359/893 |
| 2016/0216420 A1 | 7/2016 | Gaides |
| 2017/0108628 A1 | 4/2017 | Larsen |
| 2019/0129247 A1 | 5/2019 | Guo |

FOREIGN PATENT DOCUMENTS

| | | |
|---|---|---|
| KR | 10-2018-0029156 | 3/2018 |
| WO | WO 2006-025956 | 3/2006 |
| WO | WO 2006-025992 | 3/2006 |
| WO | WO 2006-102383 | 9/2006 |
| WO | WO 2015-095317 | 6/2015 |
| WO | WO 2019-118685 | 6/2019 |
| WO | WO 2020-026139 | 2/2020 |
| WO | 2020121112 A1 | 6/2020 |

OTHER PUBLICATIONS

International Search Report for PCT Application No. PCT/IB2020/055504, mailed on Nov. 23, 2020, 4 pages.

* cited by examiner

HIGH TRANSMISSION LIGHT CONTROL FILMS WITH ASYMMETRIC LIGHT OUTPUT

CROSS REFERENCE TO RELATED APPLICATIONS

This application is a national stage filing under 35 U.S.C. 371 of PCT/IB2020/055504, filed Jun. 11, 2020, which claims the benefit of U.S. Provisional Patent Application No. 62/860,350, filed Jun. 12, 2019, the disclosure of which is incorporated by reference in its/their entirety herein.

FIELD

This invention relates to light control films with asymmetric light output and to methods of making the films.

BACKGROUND

Louver-based light collimating films or light control films typically provide symmetric light output with peak brightness in the center, which gradually falls off at wider angles. For privacy filter applications, it is typically desirable to have peak brightness directed on-axis toward the viewer's eyes.

SUMMARY

For applications other than privacy filters, such as, e.g., light control films for automotive reflection management, we recognize that it can be desirable to have peak brightness shifted toward other locations in the vehicle and not directly on axis.

Briefly, in one aspect, the present invention provides light control films comprising a light input surface and a light output surface opposite the light input surface and alternating transmissive regions and absorptive regions disposed between the light input surface and the light output surface. The absorptive regions have an aspect ratio of at least 30 and are canted in the same direction. The alternating transmissive regions and absorbing regions have a maximum relative transmission at a viewing angle other than 0 degrees.

In another aspect, the present invention provides a method of making a light control film. The method comprises: (1) providing a microstructured film comprising a bottom surface and a microstructured surface opposite the bottom surface and a plurality of light transmissive regions alternated with channels, wherein the microstructured surface is defined by a top surface and first and second sidewalls of the light transmission regions and a bottom surface of the channels, wherein the first sidewall has a wall angle with a line that is perpendicular to the light output surface from +1 degree to +10 degrees or from −1 degree to −10 degrees relative to the bottom surface, (2) applying an organic light absorptive material to the microstructured surface and (3) removing light absorptive material from the first sidewall or the second sidewall.

The light control films of the invention provide high transmission with tuned peak brightness that diverts light to desired off axis angles. The methods of invention provide means for making light control films with louvers canted in the same direction, whereas previous methods were limited to making light control films with louvers orthogonal to the light input surface or louvers canted in opposite directions.

DETAILED DESCRIPTION

Figure 1A:
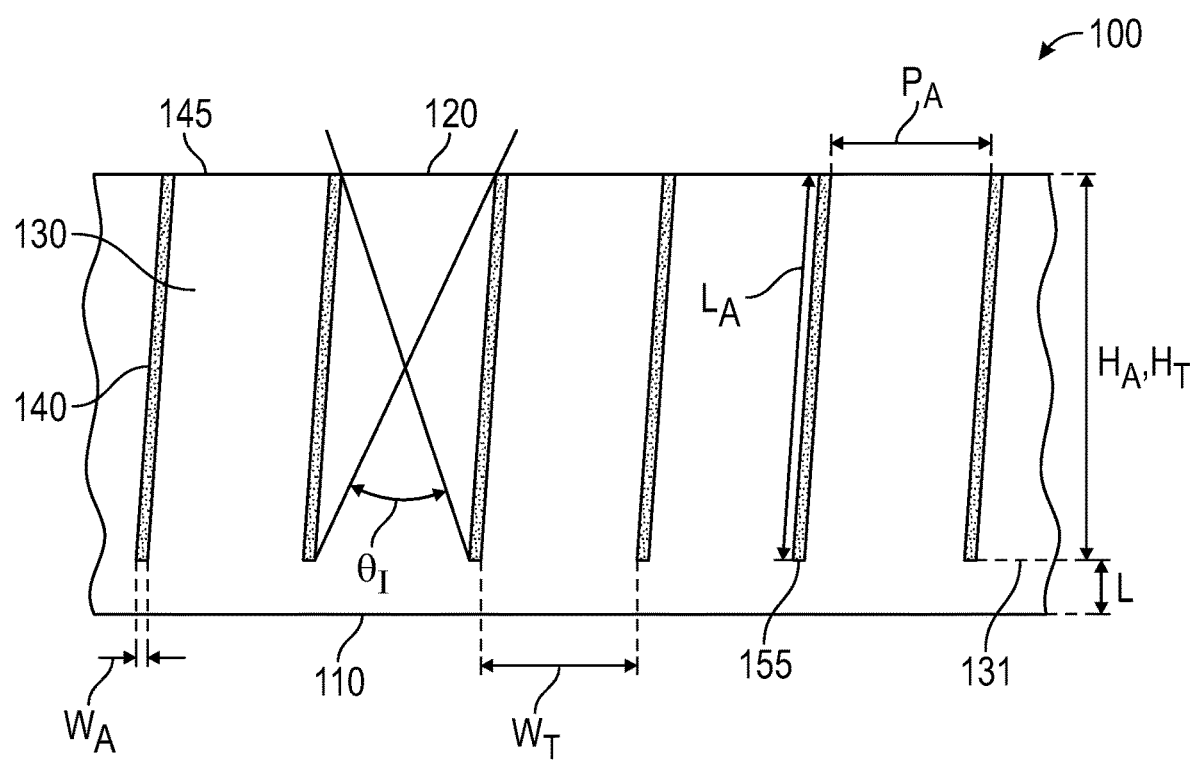
FIG. 1A is a cross-sectional view of an embodied light control film.

In one embodiment, a light control film ("LCF") is described. With reference to FIG. 1A, a cross-sectional view of an embodied LCF 100, the LCF comprises a light output surface 120 and an opposing light input surface 110. The light output surface 120 is typically parallel to the light input surface 110. LCF 100 includes alternating transmissive regions 130 and absorptive regions 140 disposed between the light output surface 120 and a light input surface 110. Absorptive regions 140 are canted in the same direction (i.e., the absorptive regions depart from a line that is perpendicular to the light output surface in the same direction).

In one embodiment, as depicted in FIG. 1A, the transmissive regions 130 are typically integral with a land region "L", meaning that there is no interface between the land region and the base portion 131 of the transmissive regions 130. Alternatively, LCF may lack such land region L or an interface may be present between the land region, L, and transmissive regions 130. In this embodiment, the land region is disposed between the alternating transmissive regions 130 and absorptive regions 140 and light input surface 110.

Alternatively, in another embodiment, surface 120 may be the light input surface and surface 110 may be the light output surface. In this embodiment, the land region is disposed between the alternating transmissive regions 130 and absorptive regions 140 and light output surface.

The transmissive regions 130 can be defined by a width "$W_T$". Excluding the land region "L", the transmissive regions 130 typically have nominally the same height as the absorptive regions 140. In typical embodiments, the height of the absorptive regions, HA, is at least 30, 40, 50, 60, 70, 80, 90 or 100 microns. In some embodiments, the height is no greater than 200, 190, 180, 170, 160, or 150 microns. In some embodiments, the height is no greater than 140, 130, 120, 110, or 100 microns. The LCF typically comprises a plurality of transmissive regions having nominally the same height and width. In some embodiments, the transmissive regions have a height, "$H_T$", a maximum width at its widest portion, "$W_T$", and an aspect ratio, $H_T/W_T$, of at least 1.75. In some embodiments, $H_T/W_T$ is at least 2.0, 2.5, 3.0, 3.5, 4.0, 4.5 or 5.0. In other embodiments, the aspect ratio of the transmissive regions is at least 6, 7, 8, 9, 10. In other embodiments, the aspect ratio of the transmissive regions is at least 15, 20, 25, 30, 35, 40, 45, or 50.

Absorptive regions 140 have a height "HA" defined by the distance between the bottom surface 155 and top surface 145, such top and bottom surfaces typically being parallel to the light output surface 120 and a light input surface 110. Absorptive regions 140 also have a length "$L_A$". The absorptive regions 140 have a maximum width $W_A$ and are spaced apart along surface light output surface 120 by a pitch "$P_A$".

The width of the absorptive regions, "$W_A$", at the base (i.e. adjacent to bottom surface 155) is typically nominally the same as the width of the absorptive regions adjacent the top surface 145. However, when the width of the absorptive regions at the base differs from the width adjacent the top surface, the width is defined by the maximum width. The maximum width of a plurality of absorptive regions can be averaged for an area of interest, such as an area in which the transmission (e.g. brightness) is measured. The LCF typically comprises a plurality of absorptive regions having nominally the same height, length and width. In typical embodiments, the absorptive regions generally have a width no greater than 10, 9, 8, 7, 6, 5, 4, 3, 2, or 1 micron. In some embodiments, the absorptive regions generally have a width no greater than 900, 800, 700, 600, or 500 nanometers. In some embodiments, the absorptive regions have a width of at least 50, 60, 70, 80, 90, or 100 nanometers.

An absorptive region can be defined by an aspect ratio, the length of the absorptive region divided by the maximum width of the absorptive region ($L_A/W_A$). In some embodiments, the aspect ratio of the absorptive regions is at least 1, 2, 3, 4, 5, 6, 7, 8, 9, or 10. In favored embodiments, the height and width of the absorptive region(s) are selected such that the absorptive region(s) have an even higher aspect ratio. In some embodiments, the aspect ratio of the absorptive regions is at least 15, 20, 25, 30, 35, 40, 45, 50, 55, 60, 65, 70, 75, 80, 85, 90, 95 or 100. In other embodiments, the aspect ratio of the absorptive regions is at least 200, 300, 400, or 500. The aspect ratio can range up to 10,000 or greater. In some embodiments, the aspect ratio is no greater than 9,000; 8,000; 7,000; 6,000, 5,000; 4,000; 3000; 2,000, or 1,000.

Figure 1B:
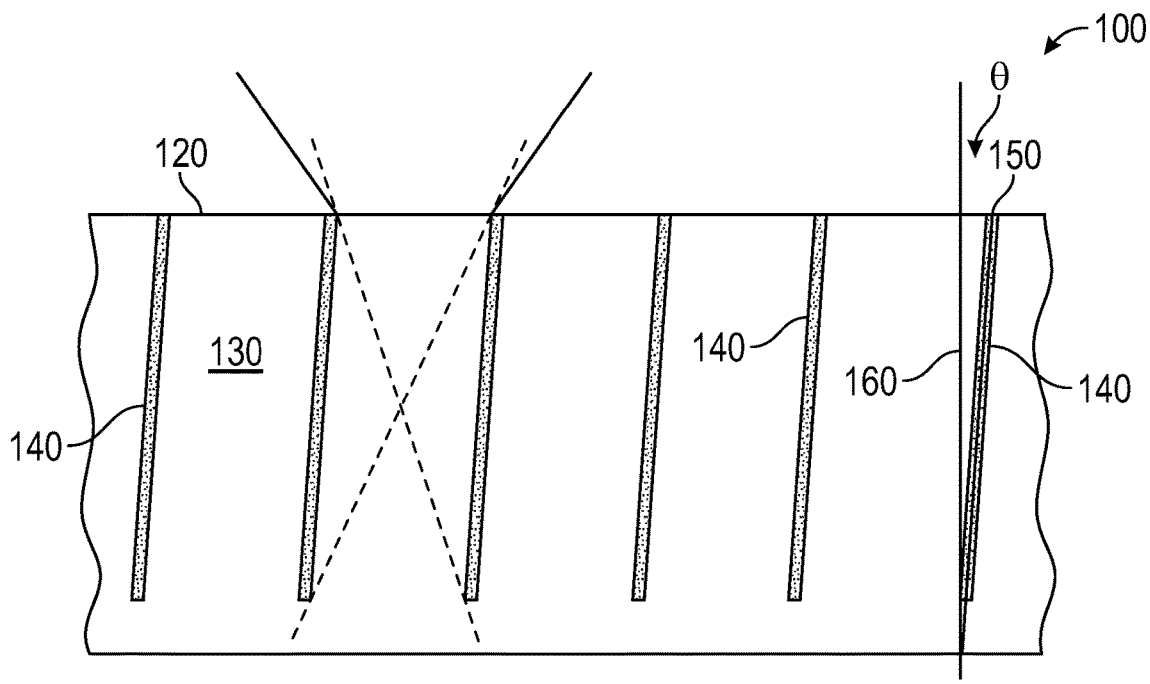
FIG. 1B depicts the polar cut-off viewing angle of the light control film of FIG. 1A.

As shown in FIG. 1B, LCF 100 includes alternating transmissive regions 130 and absorptive regions 140 canted in the same direction, and an interface 150 between transmissive regions 130 and absorptive regions 140. Interface 150 forms a wall angle θ with line 160 that is perpendicular to light output surface 120.

Larger wall angles θ decrease transmission at normal incidence or in other words at a viewing angle of 0 degrees. In some embodiments, the wall angle θ is less than 30, 20, 10, 9, 8, 7, 6, 5, 4, 3 or 2 degrees. In some embodiments, the wall angle is from +1 degree to +30 degrees, from +1 degree to +20 degrees, from +1 to +10 degrees or from +2 degrees to +8 degrees. In some embodiments, the wall angle is from −1 degree to −30 degrees, from −1 degree to −20 degrees, from −1 to −10 degrees or from −2 degrees to −8 degrees.

The transmission (e.g. brightness of visible light) can be increased when incident light undergoes total internal reflection (TIR) from the interface between the absorptive and transmissive regions. Whether a light ray will undergo TIR or not, can be determined from the incidence angle with the interface, and the difference in refractive index of the materials of the transmissive and absorptive regions.

As shown in FIG. 1b, transmissive regions 130 between absorptive regions 140 have an interface angle $θ_1$ defined by the geometry of alternating transmissive regions 130 and absorptive regions. As depicted in FIGS. 1A and 1B, the interface angle $θ_1$ can be defined by the intersection of two lines. The first line extends from a first point, defined by the bottom surface and the side wall surface of a first absorptive region, and a second point defined by the top surface and side wall surface of the nearest second absorptive region. The second line extends from a first point defined, by the top surface and the side wall surface of the first absorptive region, and a second point, defined by the bottom surface and side wall surface of the second absorptive region.

The polar cut-off viewing angle θP is equal to the sum of a polar cut-off viewing half angle $θ_1$ and a polar cut-off viewing half angle $θ_2$. In typical embodiments, polar cut-off viewing half angle $θ_1$ is not equal to polar cut-off viewing half angle $θ_2$.

Figure 4:
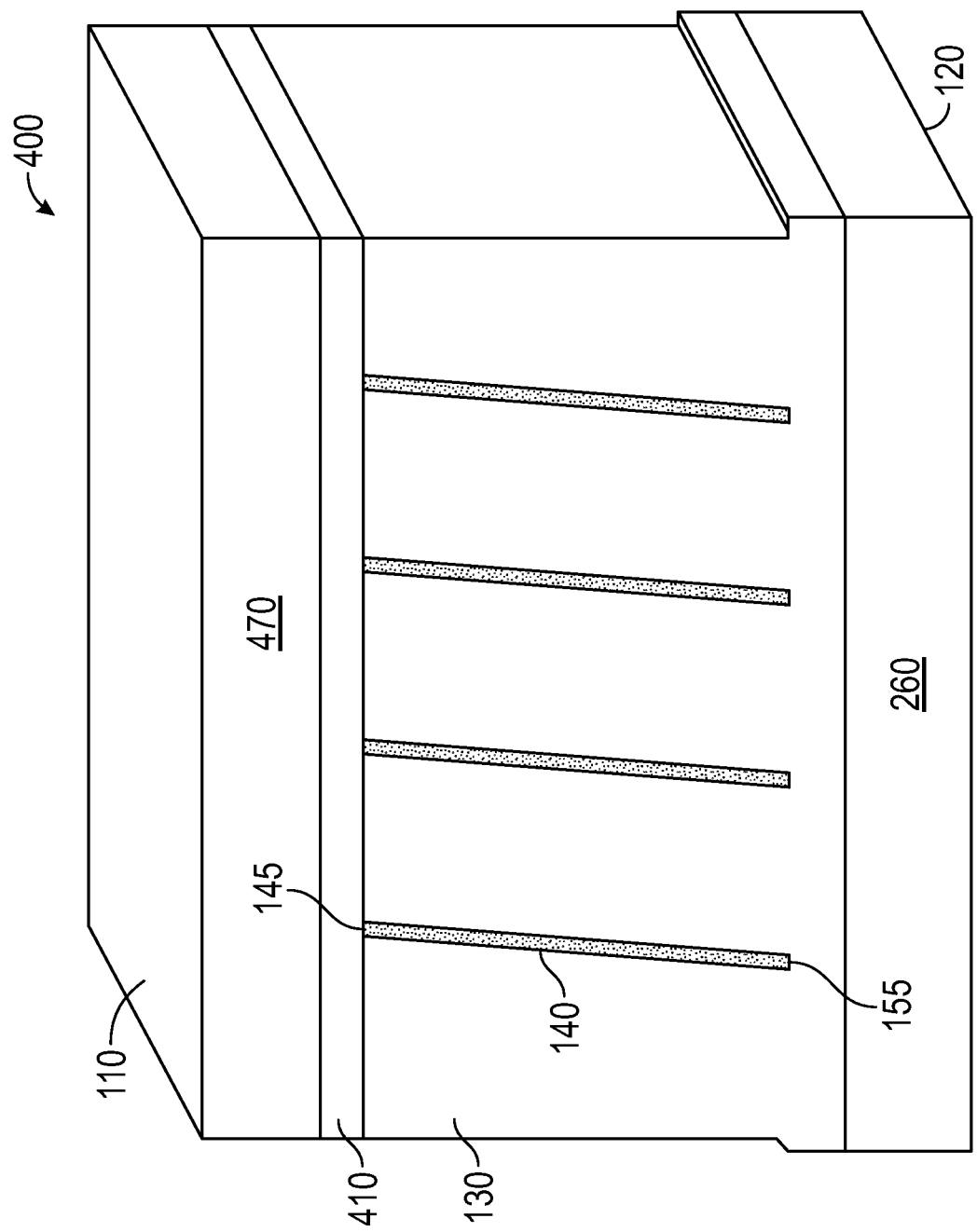
FIG. 4 is a perspective view of a light control film further comprising a cover film bonded with an adhesive layer.

Luminance can be measured according to the test method described in the examples. The luminance can be measured on the alternating transmissive and absorptive regions, such as illustrated in FIG. 1a or the total light control film that may further comprise a cover film, such as illustrated in FIG. 4. Relative transmission (e.g. brightness of visible light) is defined as the percentage of luminance, at a specified viewing angle or range of viewing angles, between a reading with the light control film including the alternating transmissive and absorptive regions and optionally other layers and a reading without the light control film (i.e. the baseline). The viewing angle can range from −90 degrees to +90 degrees. A viewing angle of 0 degrees is orthogonal to light input surface 110; whereas viewing angles of −90 degrees and +90 degrees are parallel to light input surface 110.

Unless specified otherwise, the relative transmission (e.g., brightness) refers to the relative transmission of visible light having a 400-700 nm wavelength range as measured by the test method described in further detail in the examples.

The alternating transmissive and absorptive regions or total LCF can exhibit maximum relative transmission (e.g. brightness) at a desired viewing angle other than 0 degrees. In some embodiments, the maximum relative transmission (e.g. brightness) is at least 75, 80, 85, or 90%. The maximum relative transmission (e.g. brightness) is typically less than 100%. In some embodiments, the maximum relative transmission (e.g. brightness) is at a viewing angle between −30 degrees and +30 degrees, between −20 degrees and +20 degrees, between −10 degrees and +10 degrees. In some embodiments, the maximum relative transmission (e.g. brightness) is at a viewing angle from +1 degree to +30 degrees, from +1 degree to +20 degrees, from +1 to +10 degrees or from +2 degrees to +8 degrees. In some embodiments, the maximum relative transmission (e.g. brightness) is at a viewing angle from −1 degree to −30 degrees, from −1 degree to −20 degrees, from −1 to −10 degrees or from −2 degrees to −8 degrees.

LCFs with maximum relative transmission at viewing angles other than 0 degrees are particularly suitable for applications in which a viewer does not sit directly in front of a display (viewing angle of 0 degrees) and applications where it is desirable to have the peak brightness shifted off axis. For example, for LCFs for automotive reflection management, it can be desirable to have the peak brightness shifted toward other locations in the vehicle.

Figure 2:
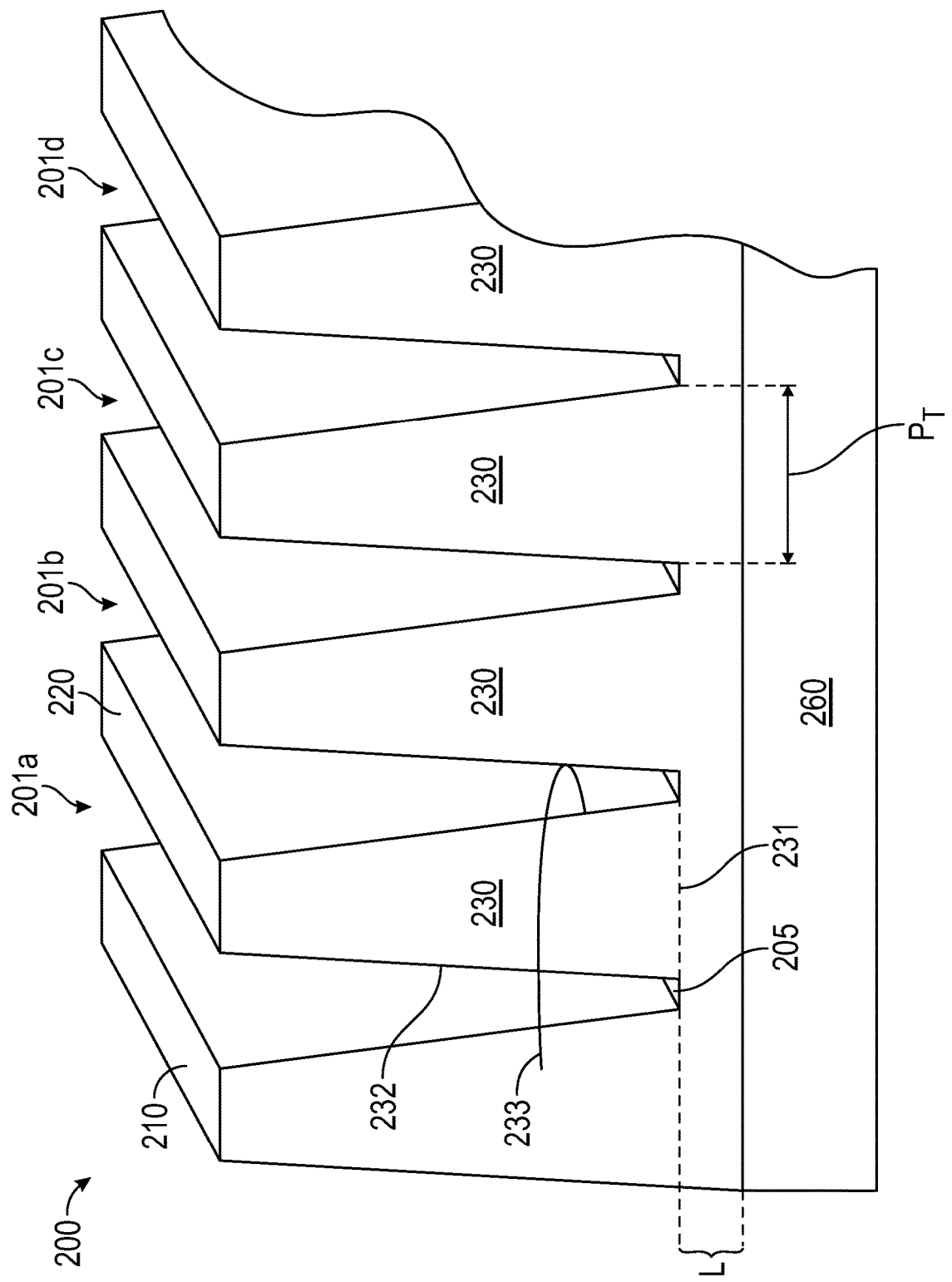
FIG. 2 is a perspective view of a microstructured film.
Figure 3A:
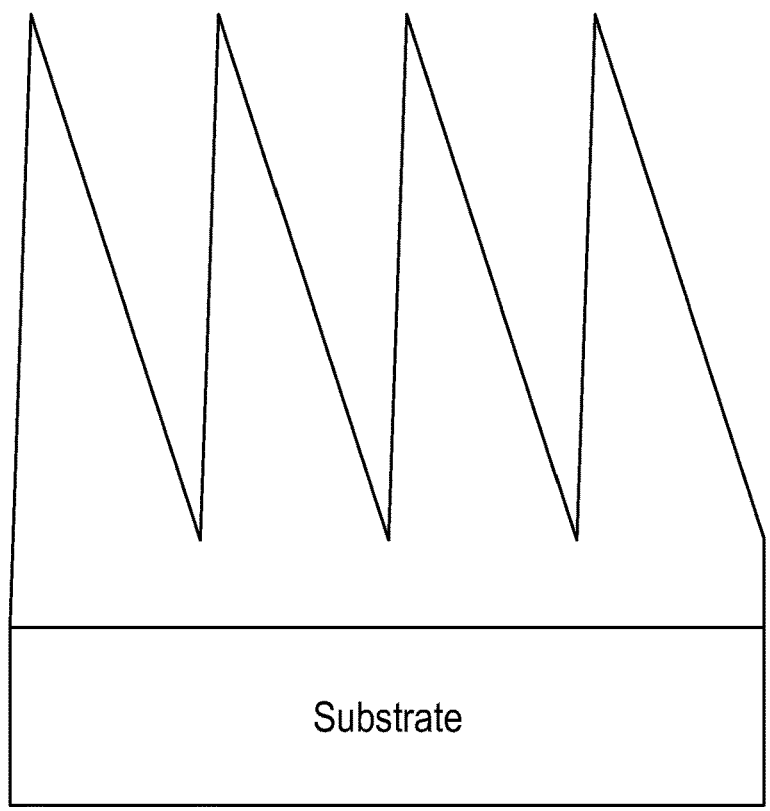
FIGS. 3A-3D are cross-sectional views of microstructured films.
Figure 3B:
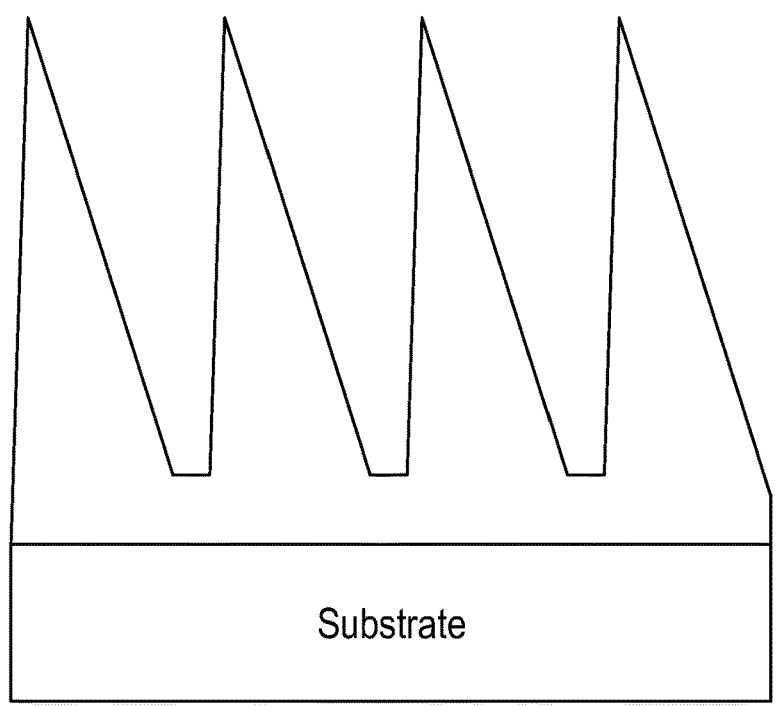
Figure 3C:
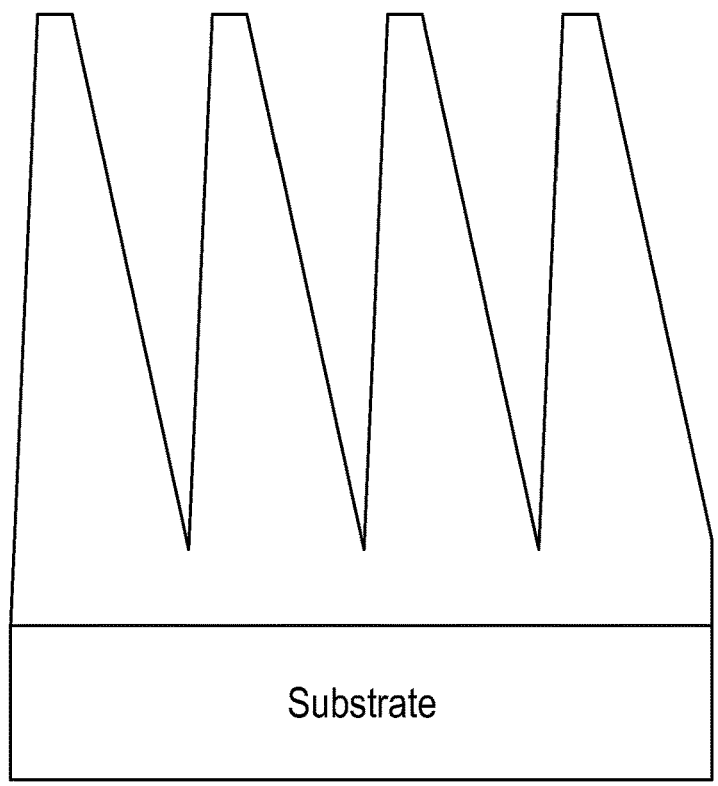
Figure 3D:
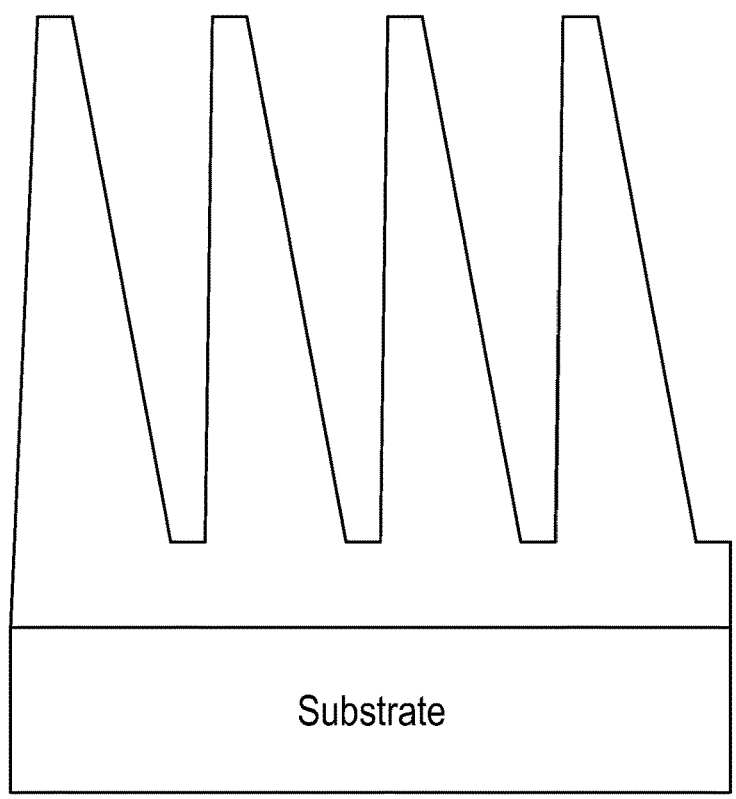

The absorptive regions can be formed by coating the surface of a microstructured film. FIG. 2 shows an embodied microstructured film article 200 that can be coated to make a LCF. The depicted microstructured film includes a microstructured surface 210 comprising a plurality of channels 201a-201d on base layer 260. As shown in FIG. 2, a continuous land layer "L" can be present between the bottom of the channels 205 and the top surface 210 of base layer 260 to base layer 260. Alternatively, the channels 201 can extend all the way through the microstructured film article 200. In this embodiment (not shown), the bottom surface 205 of the groove can be coincident with the top surface of a base layer 260. In typical embodiments, the base layer 260 is a preformed film that comprises a different organic polymeric material than the transmissive regions 230 as will subsequently be described.

The height and width of protrusions (e.g. transmissive regions) 230 are defined by adjacent channels (e.g. 201a and 201b). The protrusions (e.g. transmissive regions) 230 can be defined by a top surface 220, a bottom surface, 231, and first sidewalls 232 and second sidewalls 233 that join the top surface to the bottom surface.

In some embodiments, the first sidewalls have a wall angle less than 30, 20, 10, 9, 8, 7, 6, 5, 4, 3 or 2 degrees. In some embodiments, the first sidewalls have a wall angle from +1 degree to +30 degrees, from +1 degree to +20 degrees, from +1 to +10 degrees or from +2 degrees to +8 degrees. In some embodiments, the first sidewalls have a wall angle from −1 degree to −30 degrees, from −1 degree to −20 degrees, from −1 to −10 degrees or from −2 degrees to −8 degrees. The first sidewalls can be parallel to each other.

In some embodiments, the top surface 201 can be a relatively flat surface connecting the tops of the sidewalls 232, 233. In other embodiments, the top surface 201 can be a point at which the tops of sidewalls 232, 233 intersect. In some embodiments, the bottom surface 205 can be a relatively flat surface connecting the bottoms of the sidewalls 232, 233. In other embodiments, the bottom surface 205 can be a point at which the bottoms of sidewalls 232, 233 intersect.

The wall angle and length of the second sidewalls will vary depending upon the wall angle and length of the first sidewalls and the length of the top and bottom surfaces.

FIGS. 3A-3D illustrate microstructured films that can utilized in making LCFs according to the invention.

In some embodiments, the protrusions (e.g. transmissive regions) 230 have a pitch, "$P_T$" of at least 10 microns. The pitch is the distance between the onset of a first protrusion (e.g. transmissive region) and the onset of a second protrusion (e.g. transmissive region) as depicted in FIG. 2. The pitch may be at least 15, 20, 25, 30, 35, 40, 45, or 50 microns. The pitch is generally no greater than 1 mm. The pitch is typically no greater than 900, 800, 700, 600, or 500 microns. In some embodiments, the pitch is typically no greater than 550, 500, 450, 400, 350, 300, 250 or 200 microns. In some embodiments, the pitch is no greater than 175, 150, 100 microns. In typical embodiments, the protrusions are evenly spaced, having a single pitch. Alternatively, the protrusions may be spaced such that the pitch between adjacent protrusions is not the same. In this later embodiment, at least some and typically the majority (at least 50, 60, 70, 80, 90% or greater of the total protrusions) have the pitch just described.

The pitch of the absorptive regions $P_A$ is within the same range as just described for the light transmissive regions. In some embodiments, $P_A$ is between 10 and 50 microns.

The absorptive regions are formed by providing a light absorptive coating on the sidewalls of protrusions (e.g. transmissive regions) of a microstructured film. The thickness of the light absorptive coating is equivalent to the width of the absorptive regions, $W_A$, as previously described. The absorptive regions can be formed by any method that provides a sufficiently thin, conformal, light absorptive coating on the side walls (e.g. 232, 233).

In some embodiments, the absorptive regions comprise a core sandwiched between cladding layers. The core has a first concentration $C_1$ of a light absorbing material and the cladding layers have a second concentration $C_2$ of the light absorbing material, wherein $C_2<C_1$. The core has a first extinction coefficient, $k_1$, and the cladding layers have a second extinction coefficient, $k_2$, wherein $k_2<k_1$. Examples of cladding layers and methods of making absorptive regions having a core and cladding layers can be found, e.g., in co-pending Application No. 62/713,462.

In one embodiment, the absorptive regions are formed by a combination of additive and subtractive methods.

The light control film can be prepared by providing a microstructured film (such as the microstructured film of FIG. 2) comprising a plurality of protrusions (e.g. transmissive regions) defined by a top surface and sidewalls. The plurality of protrusions (e.g. transmissive regions) are separated from each other by channels. The sidewalls of the protrusions (e.g. transmissive regions) are coincident with the side walls of the channels. The channels further comprise a bottom surface that is parallel to or coincident with top surface of base layer. The method further comprises applying a light absorptive coating to the (e.g. entire) surface of the microstructured film, i.e. the top surface and sidewalls of the protrusions (e.g. transmissive regions) and the bottom surface of the channels that separate the protrusions (e.g. transmissive regions). The method further comprises removing the coating from the first sidewall or the second sidewall. In some embodiments, the method comprises removing at least a portion of the coating from the first sidewall and substantially all of the coating from the second sidewall, or vice versa.

In some embodiments, the method comprises removing the coating from the top surface 320 of the protrusions (e.g. transmissive regions) and bottom surface 305 of the channels.

Figure 7A:
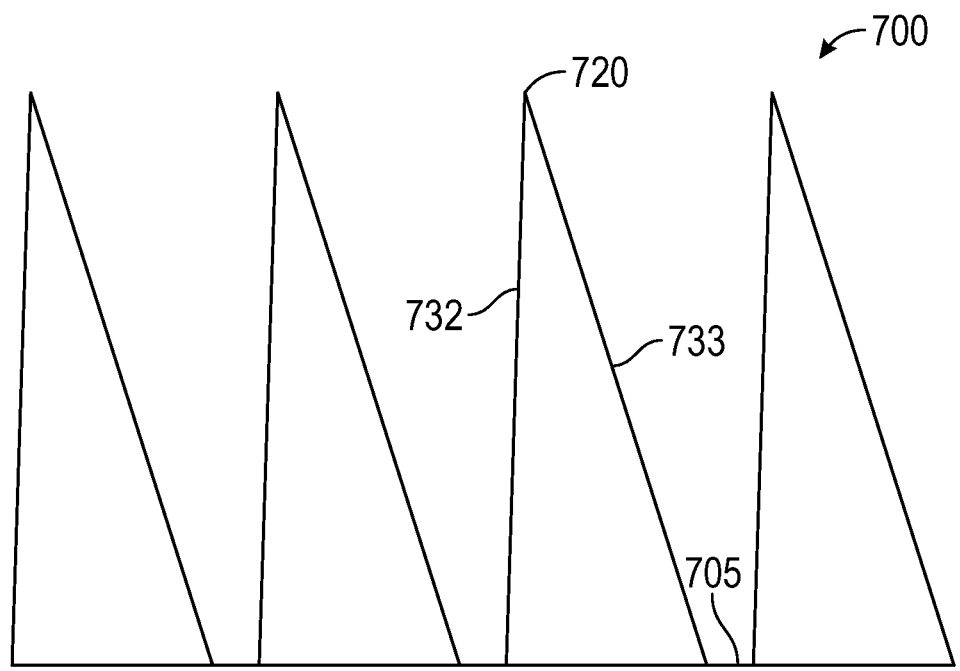
FIGS. 7A-7C are cross-sectional schematics showing an embodied method of making light control films.
Figure 7B:
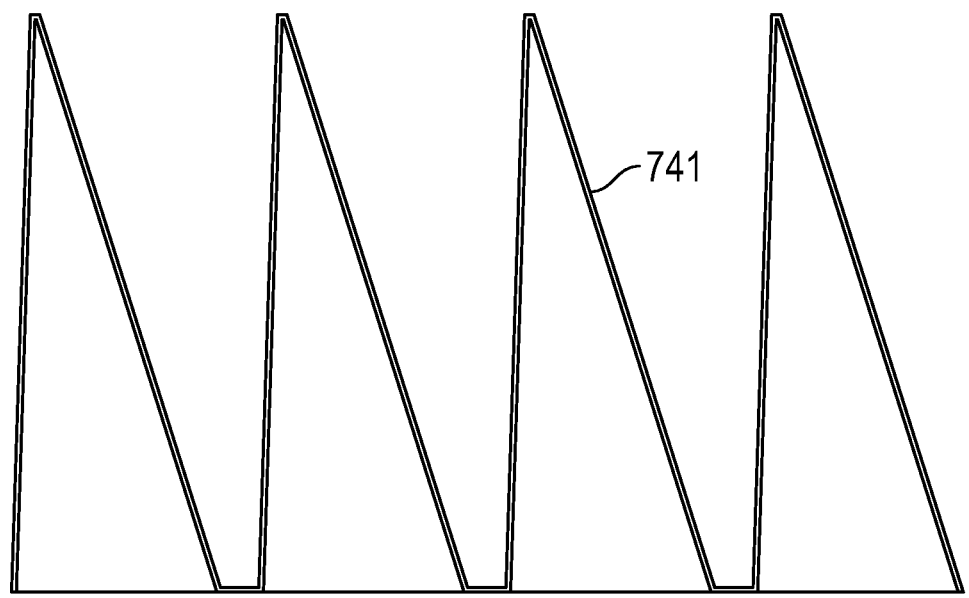
Figure 7C:
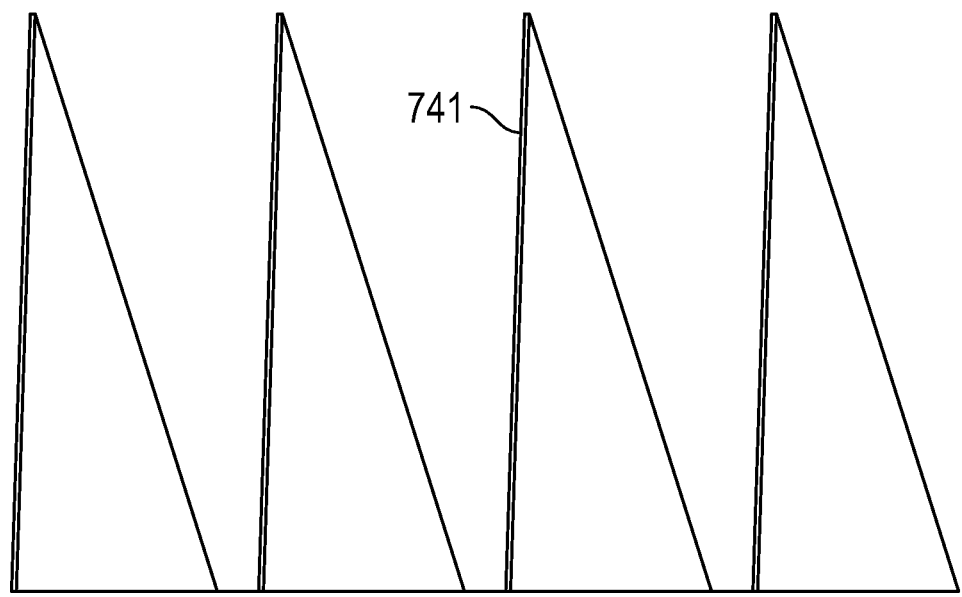

FIGS. 7A-7C illustrate a microstructured film 700 defined bottom surfaces 705, top surfaces 720, first sidewalls 732 and second sidewalls 733. Microstructured film 700 can be coated with a light absorptive material 741 (shown in FIG. 7B) and then RIE can be utilized to etch away the absorptive material 741. The absorptive material on the bottom and top surfaces and second sidewalls etches away faster (e.g., 10%, 20%, 30% or more faster) than the absorptive material on the first sidewalls to provide a light control film having absorptive material only on the first sidewalls (shown in FIG. 7C).

In some embodiments, the method further comprises filling the channels with an organic polymeric material 345 such as (e.g. the same) polymerizable resin as the protrusions (e.g. transmissive regions) and curing the polymerizable resin. When the channels are not filled with a cured polymerizable resin, the channels are typically filled with air.

A microstructure-bearing article (e.g. microstructured film article 200 shown in FIG. 2) can be prepared by any suitable method. In one embodiment, the microstructure-bearing article (e.g. microstructured film article 200 shown in FIG. 2) can be prepared by a method including the steps of (a) preparing a polymerizable composition; (b) depositing the polymerizable composition onto a master negative microstructured molding surface (e.g. tool) in an amount barely sufficient to fill the cavities of the master; (c) filling the cavities by moving a bead of the polymerizable composition between a (e.g. preformed film) base layer and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. When the base layer is a preformed film, one or more of the surfaces of the film can optionally be primed or otherwise be treated to promote adhesion with the organic material of the light transmissive regions.

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth) acrylated acrylic oligomer, and mixtures thereof.

The polymerizable resin can be a radiation curable polymeric resin, such as a UV curable resin. In some cases, polymerizable resin compositions useful for the LCF of the present invention can include polymerizable resin compositions such as are described in U.S. Pat. No. 8,012,567 (Gaides et al.), to the extent that those compositions satisfy the index and absorption characteristics herein described.

The chemical composition and thickness of the base layer can depend on the end use of the LCF. In typical embodiments, the thickness of the base layer can be at least about 0.025 millimeters (mm) and can be from about 0.05 mm to about 0.25 mm.

Useful base layer materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base layer can contain mixtures or combinations of these materials. In some embodiments, the base layer may be multi-layered or may contain a dispersed component suspended or dispersed in a continuous phase.

Examples of base layer materials include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN® polycarbonate film 8010, available from GE Polymershapes, Seattle Wash., and Panlite 1151, available from Teijin Kasei, Alpharetta Ga.

Some base layers can be optically active, and can act as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microtine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. No. 5,825,543 (Ouderkirk et al.); U.S. Pat. No. 5,783,120 (Ouderkirk et al.); U.S. Pat. No. 5,882,774 (Jonza et al.); U.S. Pat. No. 5,612,820 (Shrenk et al.) and 5,486,949 (Shrenk et al.). The use of these polarizer films in combination with prismatic brightness enhancement film has been described, for example, in U.S. Pat. No. 6,111,696 (Allen et al.) and U.S. Pat. No. 5,828,488 (Ouderkirk et al.). Films available commercially are multilayer reflective polarizer films such as 3M™ Dual Brightness Enhancement Film "DBEF", available from 3M Company.

In some embodiments, the base layer is a multilayer film that imparts a color shifting effect such as described in U.S. Pat. No. 8,503,122. Suitable color shifting films are described in U.S. Pat. No. 6,531,230 to Weber et al.; incorporated herein by reference.

Other suitable color shifting films include multilayer films generated by spin coating, blade coating, dip coating, evaporation, sputtering, chemical vapor deposition (CVD), and the like. Exemplary films include both organic and inorganic materials. Such films are described, for instance, in U.S. Pat. Nos. 7,140,741; 7,486,019; and 7,018,713. Alternatively, the microstructure-bearing article (e.g. microstructured film article 200 shown in FIG. 2) can be prepared by melt extrusion, i.e. casting a fluid resin composition onto a master negative microstructured molding surface (e.g. tool) and allowing the composition to harden. In this embodiment, the protrusions (e.g. light transmissive regions) are interconnected in a continuous layer to base layer 260. The individual protrusions (e.g. light transmissive regions) and connections therebetween generally comprises the same thermoplastic material. The thickness of the land layer (i.e. the thickness excluding that portion resulting from the replicated microstructure) is typically between 1 and 100 microns or between 2 and 25 microns.

Suitable resin compositions for melt extrusion are transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index.

In yet another embodiment, the master negative microstructured molding surface (e.g. tool) can be employed as an embossing tool, such as described in U.S. Pat. No. 4,601,861 (Pricone).

The absorptive regions are generally formed by coating the surface of a microstructured film. Various coating methods can be used including for example layer-by-layer (LbL) coating, vapor deposition, sputtering, reactive sputtering and atomic layer deposition (ALD).

Light absorbing materials useful for forming light absorbing regions can be any suitable material that functions to absorb or block light at least in a portion of the visible spectrum. Preferably, the light absorbing material can be coated or otherwise provided on the side walls of the light transmissive regions to form light absorbing regions in the LCF. Exemplary light absorbing materials include a black or other light absorbing colorant (such as carbon black or another pigment or dye, or combinations thereof). Other light absorbing materials can include particles or other scattering elements that can function to block light from being transmitted through the light absorbing regions.

When the light absorbing material (e.g. coating) includes particles, the particles have a median particle size D50 equal to or less than the thickness of the light absorbing material (e.g. coating) or in other words substantially less than the width of the absorptive regions $W_A$.

The median particle size is generally less than 1 micron. In some embodiments, the median particle size is no greater than 900, 800, 700, 600, or 500 nm. In some embodiments, the median particle size is no greater than 450, 400, 350, 300, 250, 200, or 100 nm. In some embodiments, the median particle size is no greater than 90, 85, 80, 75, 70, 65, 60, 55, or 50 nm. In some embodiments, the median particle size is no greater than 30, 25, 20, or 15 nm. The median particle size is typically at least 1, 2, 3, 4, or 5 nanometers. The particle size of the nanoparticles of the absorptive regions can be measured using transmission electron microscopy or scanning electron microscopy, for example.

"Primary particle size" refers to the median diameter of a single (non-aggregate, non-agglomerate) particle. "Agglomerate" refers to a weak association between primary particles which may be held together by charge or polarity and can be broken down into smaller entities. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles (e.g. of the coating solution) are present as discrete unagglomerated nanoparticles.

The concentration of light absorbing nanoparticles is typically at least 10, 15, 20, 25, 30, 35, 40, 45, or 50 wt.-% of the total light absorptive region. In some embodiments, the concentration of light absorbing nanoparticles is at least 55, 60, 65, 70, or 75 wt.-% of the total light absorptive regions. The concentration of light absorbing nanoparticles can be determined by methods known in the art, such as thermogravimetric analysis.

In one embodiment, the method comprises applying a layer-by-layer light absorptive coating to the surface of the microstructured film, i.e. the top surface and side walls of the protrusions and bottom surface of the channels.

In some embodiments, the plurality of layers disposed on the surface of the microstructured film comprise at least two layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. "Polyelectrolyte" means a polymer or compound with multiple ionic groups capable of electrostatic interaction. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids). Typically, this deposition process involves exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. polyelectrolyte bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion (e.g. bath) liquid solution and is then exposed to a series of water rinse baths to remove any physically entangled or loosely bound polyelectrolyte. Following these rinse (e.g. bath) liquid solutions, the substrate is then exposed to a second polyion (e.g. polyelectrolyte or inorganic oxide nanoparticle bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable processes include those described in Krogman et al., U.S. Pat. No. 8,234,998; Hammond-Cunningham et al., US2011/0064936; and Nogueira et al., U.S. Pat. No. 8,313,798. Layer-by layer dip coating can be conducted using a StratoSequence VI (nanoStrata Inc., Tallahassee, FL) dip coating robot.

In one embodiment, the plurality of layers deposited by layer-by-layer self-assembly is a polyelectrolyte stack comprising an organic polymeric polyion (e.g. cation) and counterion (e.g. anion) comprising a light absorbing material (e.g. pigment). At least a portion of the cation layers, anion layers, or a combination thereof comprise a light absorbing material (e.g. pigment) ionically bonded to the polyelectrolyte.

The thickness of a bi-layer and the number of bi-layers are selected to achieve the desired light absorption. In some embodiments, the thickness of a bi-layer, the number of bi-layers are selected to achieve the desired (e.g. absorption) optical properties using the minimum total thickness of self-assembled layers and/or the minimum number of layer-by-layer deposition steps. The thickness of each bi-layer typically ranges from about 5 nm to 350 nm. The number of bi-layers is typically at least 5, 6, 7, 8, 9, or 10. In some embodiments, the number of bilayers per stack is no greater than 150 or 100. The thickness of a stack is equivalent to the width of the absorptive regions $W_A$, as previously described.

A light absorbing compound is dispersed within at least a portion of the polyelectrolyte layers. Various polyelectrolytes can be utilized including inorganic compounds, such as silica or silicate, as well as various phosphonocarboxylic acids and salts thereof (some of which are described in WO2015/095317; incorporated herein by reference.)

Polyelectrolyte organic polymers can be preferred since such materials can be more easily removed by reactive ion etching than inorganic materials.

Suitable polycationic organic polymers include, but are not limited to linear and branched poly(ethylenimine) (PEI), poly(allylamine hydrochloride), polyvinylamine, chitosan, polyaniline, polyamidoamine, poly(vinylbenzyltriamethylamine), polydiallyldimethylammonium chloride (PDAC), poly(dimethylaminoethyl methacrylate), poly(methacryloylamino)propyl-trimethylammonium chloride, and combinations thereof including copolymers thereof.

Other examples of suitable polycationic organic polymers include those that are water insoluble, such as cation polyurethane dispersions (e.g., Sancure 20051 and Sancure 20072 from Lubrizol (Cleveland, Ohio)

Suitable polyanionic organic polymers include, but are not limited to, poly(vinyl sulfate), poly(vinyl sulfonate), poly(acrylic acid) (PAA), poly(methacrylic acid), poly(styrene sulfonate), dextran sulfate, heparin, hyaluronic acid, carrageenan, carboxymethylcellulose, alginate, sulfonated tetrafluoroethylene based fluoropolymers such as Nafion®, poly(vinylphosphoric acid), poly(vinylphosphonic acid), and combinations thereof including copolymers thereof. Other examples of suitable polyanionic organic polymers include those that are water insoluble, such as anionic polyurethane dispersions, or anionic acrylic polymer emulsions.

The molecular weight of the polyelectrolyte polymers can vary, ranging from about 1,000 g/mole to about 1,000,000 g/mole. In some embodiments, the molecular weight (Mw) of the (e.g. poly(acrylic acid)) negatively charged anionic layer ranges from 50,000 g/mole to 150,000 g/mole. In some embodiments, the molecular weight (Mw) of the (e.g. polydiallyldimethylammonium chloride) positively charged cationic layer ranges from 50,000 g/mole to 300,000 g/mole. In some embodiments, the molecular weight (Mw) of the (e.g. poly(ethyleneimine) positively charged cationic layer ranges from 10,000 g/mole to 50,000 g/mole.

At least one of the polyions (e.g. the polyanion or polycation) comprises a light absorbing material.

In order to be stable in water as a colloidal dispersion and impart ionic groups, the light absorbing (e.g. pigment) particles typically further comprise an ionic surface treatment. In some embodiments, the surface treatment compound is anionic, such as in the case of sulfonate or carboxylate. The light absorbing (e.g. pigment) particles also function as the polyion with ionic binding groups for the alternating polyelectrolyte layer.

Suitable pigments are available commercially as colloidally stable water dispersions from manufacturers such as Cabot, Clariant, DuPont, Dainippon and DeGussa. Particularly suitable pigments include those available from Cabot Corporation under the CAB-O-JET® name, for example 250C (cyan), 260M (magenta), 270Y (yellow) or 352K (black). The light absorbing (e.g. pigment) particles are typically surface treated to impart ionizable functionality. Examples of suitable ionizable functionality for light absorbing (e.g. pigment) particles include sulfonate functionality, carboxylate functionality as well as phosphate or bisphosphonate functionality. In some embodiments, surface treated light absorbing (e.g. pigment) particles having ionizable functionality are commercially available. For example, CAB-O-JET® pigments, commercially available from Cabot Corporation, sold under the trade names 250C (cyan), 260M (magenta), 270Y (yellow) and 200 (black), comprise sulfonate functionality. As yet another example, CAB-O-JET® pigments commercially available from Cabot Corporation, under the trade names 352K (black) and 300 (black), comprise carboxylate functionality.

When the light absorbing (e.g. pigment) particles are not pre-treated, the light absorbing (e.g. pigment) particles can be surface treated to impart ionizable functionality as known in the art.

Multiple light absorbing materials (e.g. pigments) may be utilized to achieve a specific hue or shade or color in the final product. When multiple light absorbing materials (e.g. pigments) are used, the materials are selected to ensure their compatibility and performance both with each other and with the optical product components.

In favored embodiments, the polyelectrolyte is prepared and applied to the microstructured surface as an aqueous solution or suspension. The term "aqueous" means that the liquid of the coating contains at least 85 percent by weight of water. It may contain a higher amount of water such as, for example, at least 90, 95, or even at least 99 percent by weight of water or more. The aqueous liquid medium may comprise a mixture of water and one or more water-soluble organic cosolvent(s), in amounts such that the aqueous liquid medium forms a single phase. Examples of water-soluble organic cosolvents include methanol, ethanol, isopropanol, 2-methoxyethanol, 3-methoxypropanol, 1-methoxy-2-propanol, tetrahydrofuran, and ketone or ester solvents. The amount of organic cosolvent typically does not exceed 15 wt-% of the total liquids of the coating composition. The aqueous polyelectrolyte composition for use in layer-by-layer self-assembly typically comprises at least 0.01 wt-%, 0.05 wt-% or 0.1 wt-% of polyelectrolyte and typically no greater than 5 wt-%, 4 wt-%, 3 wt-%, 2 wt-% or 1 wt-%.

In some embodiments, the aqueous solutions or suspensions further comprise a "screening agent", an additive that promotes even and reproducible deposition by increasing ionic strength and reducing interparticle electrostatic repulsion. Suitable screening agents include any low molecular weight salts such as halide salts, sulfate salts, nitrate salts, phosphate salts, fluorophosphate salts, and the like. Examples of halide salts include chloride salts such as LiCl, NaCl, KCl, $CaCl_2$, $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents.

Suitable screening agent concentrations can vary with the ionic strength of the salt. In some embodiments, the aqueous solution comprises (e.g. NaCl) screening agent at a concentration ranging from 0.01 M to 0.1M. The absorptive regions may contain trace amounts of screening agent.

After applying and drying the light absorbing coating to the (e.g. entire) surface of the microstructured film, the light absorbing coating is then removed from the first sidewall or the second sidewall. In some embodiments, the coating is substantially or completely removed from one of the sidewalls. In some embodiments, material is removed from both sidewalls, but to varying extents. The light absorbing coating can also be removed from the top portions of the transmissive (e.g. protrusions) regions and also removed from the land regions, between the transmissive (e.g. protrusions) regions.

Any suitable method can be used to selectively remove the light absorbing material from surfaces of the microstructured surface.

In one embodiment, the light absorbing material is removed by reactive ion etching. Reactive ion etching (RIF) is a directional etching process utilizing ion bombardment to remove material. RIE systems are used to remove organic or inorganic material by etching surfaces orthogonal to the direction of the ion bombardment. The most notable difference between reactive ion etching and isotropic plasma etching is the etch direction. Reactive ion etching is characterized by a ratio of the vertical etch rate to the lateral etch rate which is greater than 1. Systems for reactive ion etching are built around a durable vacuum chamber. Before beginning the etching process, the chamber is evacuated to a base pressure lower than 1 Torr, 100 mTorr, 20 mTorr, 10 mTorr, or 1 mTorr. An electrode holds the materials to be treated and is electrically isolated from the vacuum chamber. The electrode may be a rotatable electrode in a cylindrical shape. A counter electrode is also provided within the chamber and may be comprised of the vacuum reactor walls. Gas comprising an etchant enters the chamber through a control valve. The process pressure is maintained by continuously evacuating chamber gases through a vacuum pump. The type of gas used varies depending on the etch process. Carbon tetrafluoride (CFO, sulfur hexafluoride ($SF_6$), octafluoropropane ($C_3F_8$), fluoroform ($CHF_3$), boron trichloride ($BCl_3$), hydrogen bromide (HBr), chlorine, argon, and oxygen are commonly used for etching. RF power is applied to the electrode to generate a plasma. Samples can be conveyed on the electrode through plasma for a controlled time period to achieve a specified etch depth. Reactive ion etching is known in the art and further described in U.S. Pat. No. 8,460,568; incorporated herein by reference.

In another embodiment, the light absorbing material is removed by laser ablation, e.g., pulsed laser ablation. Pulsed laser ablation (PLA) is a directional ablation process utilizing a photon flux to generate enough photon fluence to remove material through oxidation and/or sputtering. PLA systems are used to remove organic or inorganic material by etching surfaces orthogonal to the direction of the photon fluence which can vaporize the target in the generation of a plasma plume. PLA is dependent on the wavelength of the laser, and the amount of absorption present at that wavelength in the light absorbing material. Absorption of the laser pulse generates energy far thermal, chemical, or mechanical evaporation, ablation, and/or plasma formation. The presence of oxidizing gas in the location of the laser pulse may change the amount of chemical oxidation occurring during the PLA process. Light absorbing materials require a critical amount of fluence to be ablated. The fluence can be changed by the optical configuration to change the size and location of the focal spot and by the power setpoints of laser systems. The relative orientation of the laser fluence and the sample can allow one skilled in the art to ablate light absorbing materials coated on a structured surface at oblique angles.

After removing the light absorbing coating, the channels can be filled with an organic polymeric material. In some embodiments, the organic polymeric material is a polymerizable resin composition and the method further comprising (e.g. radiation) curing the polymerizable resin. Typically, the same polymerizable resin used in the manufacture of the microstructured film is utilized for filling the channels. Alternatively, a different organic polymeric material (e.g. polymerizable resin composition) is used. When a different organic polymer material (e.g. polymerizable resin composition) is used, the composition is typically selected to be index matched to the light transmissive regions. By "index matched", it is meant that the difference in refractive index between the filling material and transmissive regions is typically less than 0.1 or 0.005. Alternatively, the channels may be filled with a different organic polymeric material (e.g. polymerizable resin composition) having a difference in refractive index of greater than 0.1. In yet another embodiment, the channels are not filled with an organic polymeric material (e.g. polymerized resin). In this embodiment, the channels typically comprise air, having a refractive index of 1.0.

When the channels are filled with a cured polymerizable resin, the light control film may optionally include cover film 470 bonded to the microstructured film with adhesive 410. When the channels are filled with air, the adhesive film and cover film are typically included.

In yet another embodiment, layer 410 may be a topcoat rather than adhesive. In this embodiment, cover film 470 may not be present.

FIG. 4 shows an LCF 400 that further includes an optional cover film 470 that can be the same, or different than, base layer 260. Optional cover film 470 can be bonded to the microstructured surface with an adhesive 410. Adhesive 410 can be any optically clear adhesive, such as a UV-curable acrylate adhesive, a transfer adhesive, and the like.

The LCF may further comprise other coatings typically provided on the exposed surface. Various hardcoats, antiglare coatings, antireflective coatings, antistatic, and antisoiling coatings are known in the art. See for example U.S. Pat. Nos. 7,267,850; 7,173,778, PCT Publication Nos. WO2006/102383, WO2006/025992, WO2006/025956 and U.S. Pat. No. 7,575,847.

Figure 5:
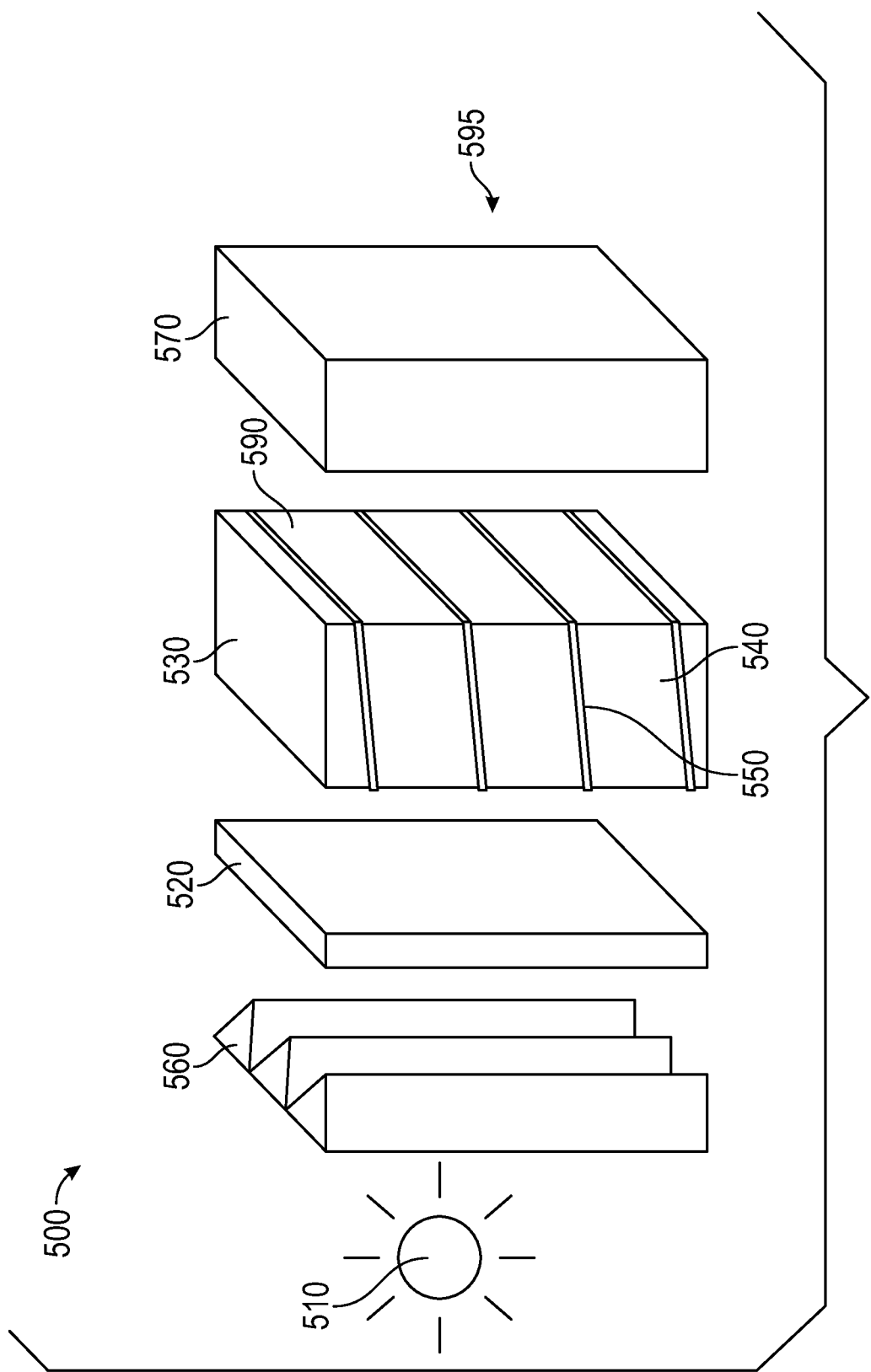
FIG. 5 is a perspective view of a backlit display comprising an embodied light control film.

FIG. 5 shows a perspective schematic of a backlit display 500 according to one embodiment. Backlit display 500 includes an LCF 530 comprising transmissive regions 540 and absorptive regions 550 as previously described. Such LCF has a polar cut-off viewing angle θP, as previously described, of light leaving an output surface 590 of LCF 530. Backlit display 500 includes a light source 510 configured to transmit light through LCF 530, through an image plane 520, such as an LCD panel, and on to a viewer 595. The viewing angle at which the brightness is a maximum, can depend on the polar cut-off viewing angle as previously described.

Backlit display 500 can also include an optional brightness enhancement film 560 and a reflective polarizer film 570 to further improve the brightness and uniformity of the display. Brightness enhancement film can be a prism film, such as 3M™. Brightness Enhancement Film "BEF" or Thin Brightness Enhancement Film "TBEF", available from 3M Company. Reflective polarizer film 570 can be a multilayer optical film, such as 3M™. Dual Brightness Enhancement Film "DBEF", available from 3M Company, St. Paul, MN Brightness enhancement film 560 and reflective polarizer film 570, if included, can be positioned as shown in FIG. 5.

In other embodiments, the light control film comprising transmissive regions and absorptive regions, as previously described, can be bonded to an emissive (e.g. an organic light emitting diode, or OLED) display.

In some embodiments, the LCF described herein (i.e. a first LCF) can be combined with a second LCF. In some embodiments, the second LCF may be a LCF (e.g. privacy film) such described in U.S. Pat. Nos. 6,398,370; 8,013,567; 8,213,082; and 9,335,449. In other embodiments, the second LCF is an LCF as described herein (e.g. wherein the light absorbing regions have an aspect ratio of at least 30). The first and second LCFs can be stacked in various orientations.

Other types of backlit display imaging devices are also contemplated, including non-electronic displays such as sunglasses, document coversheets, console switches in auto and aviation applications, airplane cockpit controls, helicopter cockpit controls, windows and any number of others.

In further embodiments, the light control film described herein can be useful as coverings for glass. For instance, the light control films may be laminated onto or within fenestrations. The fenestrations may be selected from a glass panel, a window, a door, a wall, and a skylight unit. These fenestrations may be located on the outside of a building or on the interior. They may also be car windows, train windows, airplane passenger windows, or the like. Advantages of incorporating these film stacks into fenestrations include reduced IR transmission (which may lead to increased energy savings), ambient light blocking, privacy, and decorative effects.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by consideration of the embodiments shown by the testing results and examples that follow.

EXAMPLES

Objects and advantages of this invention are further illustrated by the following examples, but the particular materials and amounts thereof recited in these examples, as well as other conditions and details, should not be construed to unduly limit this invention.

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Missouri.

The following is a list of materials used throughout the Examples, as well as their brief descriptions and origins.

The components of Resin A used in the cast-and-cure microreplication process (Preparative Example 1) as well as the index-matched backfill material in "Method for Back-Filling Channels of the Microstructured Film" are listed in Table 1 below. The raw materials for the layer-by-layer coating are listed in Table 2 below. The raw materials for reactive ion etching are listed in Table 3 below.

TABLE 1

Raw materials for Resin A

| Material | Abbreviation | Source |
|---|---|---|
| Aliphatic urethane diacrylate Viscosity 5900 mPa · s at 60° C. Tensile Strength 2060 psi Tg = −7° C. | Photomer 6010 | BASF |
| Ethoxylated (10) bisphenol A diacrylate | SR602 | Sartomer (Exton, PA) |
| Ethoxylated (4) bisphenol A diacrylate | SR601 | Sartomer (Exton, PA) |
| Trimethylolpropane triacrylate | TMPTA | Cytec Industries (Woodland Park, NJ) |
| Phenoxyethyl Acrylate | PEA (Etermer 2010) | Eternal Chemical Co., Ltd., Kaohsiung, Taiwan |
| 2-Hydroxy-2-methylpropiophenone photoinitiator | Darocur 1173 | BASF Corporation (Florham Park, New Jersey) |
| Diphenyl(2,4,6-trimethylbenzoyl)phosphine oxide photoinitiator | TPO | BASF Corporation (Florham Park, New Jersey) |

TABLE 1-continued

Raw materials for Resin A

| Material | Abbreviation | Source |
|---|---|---|
| Irgacure 1035 anti-oxidant | I1035 | BASF Corporation (Florham Park, New Jersey) |

TABLE 2

Raw materials for the layer-by-layer coatings

| Material | Abbreviation | Source |
|---|---|---|
| Sancure ® 20051 cationic polyurethane dispersion | SC20051 | Lubrizol (Cleveland, Ohio) |
| CAB-O-JET ® 200 carbon black nano-pigment, sulfonate functionalized | COJ200 | Cabot Corporation (Boston, Massachusetts) |
| Sodium chloride | NaCl | Sigma-Aldrich Co. (St. Louis, Missouri) |
| Pluronic PL-92 | PL92 | BASF, Ludwigshafen, Germany |

TABLE 3

Raw materials for reactive ion etching

| Material | Abbreviation | Source |
|---|---|---|
| Oxygen (UHP compressed gas) | $O_2$ | Oxygen Service Company (St Paul, Minnesota) |
| Argon (UHP compressed gas) | Ar | Oxygen Service Company (St Paul, Minnesota) |

Preparative Example 1 (PE1): Preparation of "Sharkfin" Microstructured Film

Figure 6:
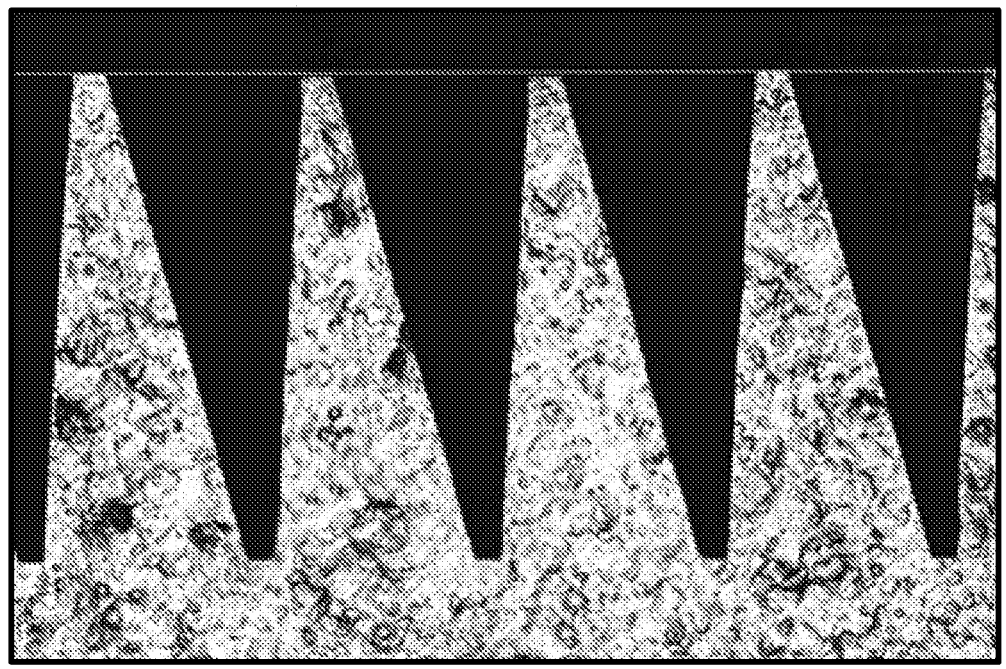
FIG. 6 is a cross section of a microstructured film of Preparative Example 1.

A triangular shaped diamond was used to cut a tool having a plurality of nearly triangular features, shown with dimensions in FIG. 6. Resin A was prepared by mixing the materials in Table 4 below.

TABLE 4

Composition of Resin A used to make microstructured film

| Material | Parts by Weight |
|---|---|
| Photomer 6010 | 60 |
| SR602 | 20 |
| SR601 | 4.0 |
| TMPTA | 8.0 |
| PEA (Etermer 2010) | 8.0 |
| Darocur 1173 | 0.35 |
| TPO | 0.10 |
| I1035 | 0.20 |

A "cast-and-cure" microreplication process was carried out with Resin A and the tool described above. The line conditions were: resin temperature 150° F., die temperature 150° F., coater IR 135° F., tool temperature 100° F., and line speed 60 fpm. Fusion D lamps, with peak wavelength at 385 nm, were used for curing and operated at 100% power. The resulting microstructured film comprised a plurality of triangular protrusions (e.g. light transmissive regions) separated by channels as illustrated in FIG. 8. The base layer was PET film (3M, St. Paul, MN), having a thickness of 2.93 mils (74.4 microns). The side of the PET film that contacts the resin was primed with a thermoset acrylic polymer (Rhoplex 3208 available from Dow Chemical, Midland, MI). The land layer of the cured resin had a thickness of 2-3 microns. The triangles of the microstructured film are a negative replication of the uncut portions of the tool between the grooves.

Method for Making Layer-by-Layer Self-Assembled Coatings on Microstructured Film Layer-by-layer self-assembled coatings were made using an apparatus purchased from Svaya Nanotechnologies, Inc. (Sunnyvale, CA) and modeled after the system described in U.S. Pat. No. 8,234,998 (Krogman et al.) as well as Krogman et al. Automated Process for Improved Uniformity and Versatility of Layer-by-Layer Deposition, Langmuir 2007, 23, 3137-3141.

The apparatus comprises pressure vessels loaded with the coating solutions. Spray nozzles with a flat spray pattern (from Spraying Systems, Inc., Wheaton, Illinois) were mounted to spray the coating solutions and rinse water at specified times, controlled by solenoid valves. The pressure vessels (Alloy Products Corp., Waukesha, WI) containing the coating solutions were pressurized with nitrogen to 30 psi, while the pressure vessel containing deionized (DI) water was pressurized with air to 30 psi. Flow rates from the coating solution nozzles were each 10 gallons per hour, while flow rate from the DI water rinse nozzles were 40 gallons per hour. The substrate to be coated was adhered at the edges with epoxy (Scotch-Weld epoxy adhesive, DP100 Clear, 3M Company, St. Paul, MN) to a glass plate (12"× 12"×⅛" thick) (Brin Northwestern Glass Co., Minneapolis, MN), which was mounted on a vertical translation stage and held in place with a vacuum chuck. In a typical coating sequence, the polycation (e.g., PDAC) solution was sprayed onto the substrate while the stage moved vertically downward at 76 mm/sec. Next, after a dwell time of 12 sec, the DI water solution was sprayed onto the substrate while the stage moved vertically upward at 102 mm/sec. The substrate was then dried with an airknife at a speed of 3 mm/sec. Next, the polyanion (e.g., pigment nanoparticles) solution was sprayed onto the substrate while the stage moved vertically downward at 76 mm/sec. Another dwell period of 12 sec was allowed to elapse. The DI water solution was sprayed onto the substrate while the stage moved vertically upward at 102 mm/sec. Finally, the substrate was then dried with an airknife at a speed of 3 mm/sec. The above sequence was repeated to deposit a number of "bi-layers" denoted as (Polycation/Polyanion)$_n$ where n is the number of bi-layers. The coating substrate (e.g. polymer film) was stripped off of the glass prior to subsequent processing.

Preparative Example 2 (PE2): Layer-by-Layer Self-Assembled Coatings on Microstructured Film The cationic coating solution was prepared by first diluting Sancure 20051 (Lubrizol, Wickliffe, Ohio) from 42 wt % to 1 wt % with DI water. Next, Pluronic PL-92 (BASF, Ludwigshafen, Germany) surfactant was added to a concentration of 0.1 wt %. The mixture was shaken by hand to dissolve the surfactant. The anionic coating solution was prepared by first diluting CAB-O-JET 200 (Cabot Corp., Boston, Massachusetts) from 20 wt % to 2.5 wt % with DI water. Next, sodium chloride (Sigma Aldrich Co., St. Louis, Missouri) was added to a concentration of 50 mM, and Pluronic PL-92 (BASF, Ludwigshafen, Germany) surfactant was added to a concentration of 0.1 wt %. The mixture was shaken by hand to dissolve the salt and surfactant. A 10-bilayer coating, abbreviated as (SC20051/COJ200)10, was deposited onto the microstructured film described in PE1 using the "Method for Making Layer-by-Layer Self-Assembled Coatings on Microstructured Film".

Method for Back-Filling Channels of the Microstructured Film

Resin A was heated to 165° F. in an oven. A microstructured film sample, following the reactive ion etching or laser ablation step, was taped to an aluminum plate, and then placed on a hot plate heated to 150° F. Resin A was pipetted between the microstructured film surface and a piece of primed, 3 mil-thick PET film placed on top; this construction was then sent through a GBC Catena 35 hot roll laminator heated to 135° F. with a speed of 5 ft/min. The construction was then sent through a Heraeus (Hanau, Germany) belt conveyer UV processor (Model # DRS(6)) with an 'H' bulb at 500 Watt power three times at a conveyer speed of 50 ft/min. After curing, the PET top film was either left in place or stripped off as specified in the Examples.

Method for Measuring the Luminance Profile from a Diffuse Light Source

A sample of film was placed on a Lambertian light source. When the light transmissive regions are tapered, the film is positioned such that the widest portion of the tapered regions are closer to the light source. An Eldim L80 conoscope (Eldim S. A., HEROUVILLE SAINT CLAIR, France) was used to detect light output in a hemispheric fashion at all polar and azimuthal angles simultaneously. After detection, a cross section of transmission (e.g. brightness) readings were taken in a direction orthogonal to the direction of the louvers (denoted as a 0° orientation angle), unless indicated otherwise. Relative transmission (i.e. brightness of visible light) is defined as the percentage of on-axis luminance, at a certain viewing angle, between a reading with film and a reading without the film.

The Lambertian light source consisted of diffuse transmission from a light box having the baseline luminance profile depicted in FIG. 6 of PCT/US18/65381. The light box was a six-sided hollow cube measuring approximately 12.5 cm×12.5 cm×11.5 cm (L×W×H) made from diffuse polytetrafluoroethylene (PTFE) plates of ~6 mm thickness. One face of the box was chosen as the sample surface. The hollow light box had a diffuse reflectance of ~0.83 measured at the sample surface (e.g. ~83%, averaged over the 400-700 nm wavelength range). During testing, the box was illuminated from within through a ~1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCR-II with a 1 cm diameter fiber bundle extension from Schott-Fostec LLC, Marlborough Mass. and Auburn, N.Y.).

Example 1: Reactive Ion Etch of Horizontal and Diagonal Surfaces

Reactive ion etching (RIE) was conducted on a sample of material from PE2. This was performed in a home-built parallel plate capacitively coupled plasma reactor. The chamber had a central cylindrical powered electrode with a surface area of 18.3 ft$^2$. After placing the microstructured film on the powered electrode, the reactor chamber was pumped down to a base pressure of less than 1.3 Pa (2 mTorr). O$_2$ (oxygen) gas was flowed into the chamber, each at a rate of 1000 SCCM. Treatment was carried out using a plasma enhanced CVD method by coupling RF power into the reactor at a frequency of 13.56 MHz and an applied power of 9000 watts. A treatment time of 250 s was applied by moving the microstructured film through the reaction zone. Following the treatment, the RF power and the gas supply were stopped and the chamber was returned to atmospheric pressure. Additional information regarding materials and processes for applying cylindrical RIE and further details around the reactor used can be found in U.S. Pat. No. 8,460,568 B2.

The etched material was then backfilled with UV curable acrylate resin as shown in the "Method for Back-Filling Channels of the Microstructured Film" section, above, and measured as shown in the "Method for Measuring the Luminance Profile from a Diffuse Light Source" section, above. The peak transmission angle was obtained from the conoscopic data by finding the angle at which the maximum luminance was observed and was determined to be −3 degrees. The maximum relative transmission was 90.9%.

Example 2: Laser Ablation Removal of LbL Material from Near Vertical Surfaces

The laser illumination system described in U.S. Pat. No. 6,285,001B1 was used to illuminate a sample of the substrate of PE2. The substrate was tilted at a 10-degree angle relative to the focal plane of the laser illumination system. The near vertical wall was thus exposed while the diagonal wall of the substrate was in shadow. The substrate was illuminated 6 times with 300 mJ/cm^2 of 248 nm light from a Coherent LEAP 200K excimer laser.

The ablated material was then backfilled with UV curable acrylate resin as shown in the "Method for Back-Filling Channels of the Microstructured Film" section, above, and measured as shown in the "Method for Measuring the Luminance Profile from a Diffuse Light Source" section, above. The peak transmission angle was obtained from the conoscopic data by finding the angle at which the maximum luminance was observed and was determined to be 20 degrees. The maximum relative transmission was 25.3%.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A light control film comprising:
a light input surface and a light output surface opposite the light input surface and a microstructured surface comprising a plurality of
alternating protrusions and channels disposed between the light input and output surfaces, each of the protrusions comprising opposing first and second sidewalls defining a plurality of alternating first and second sidewalls of the microstructured surface, a light absorbing material disposed on only on the first sidewalls to define a plurality of alternating transmissive regions and absorptive regions disposed between the light input surface and the light output surface, wherein the absorptive regions have an aspect ratio of at least 30 and are canted in the same direction, and the alternating transmissive regions and absorbing regions have a maximum relative transmission at a viewing angle other than 0 degrees.

2. The light control film of claim 1 wherein the alternating transmissive regions and absorbing regions have a maximum relative transmission at a viewing angle other than 0 degrees of at least 75%.

3. The light control film of claim 1 wherein the maximum relative transmission is at a viewing angle between +30 degrees and −30 degrees.

4. The light control film of claim 3 wherein the maximum relative transmission is at a viewing angle between +10 degrees and −10 degrees.

5. The light control film of claim 1 wherein the absorptive regions have a wall angle with a line that is perpendicular to the light output surface from +1 degree to +10 degrees or from −1 degree to −10 degrees.

6. The light control film of claim 5 wherein the absorptive regions have a wall angle with a line that is perpendicular to the light output surface from +2 degrees to +8 degrees or from −2 degrees to −8 degrees relative to the light input surface.

7. The light control film of claim 1 wherein the absorptive regions are parallel to each other.

8. The light control film of claim 1 wherein the absorptive regions have an aspect ratio of at least 50.

9. The light control film of claim 8 wherein the absorptive regions have an aspect ratio of at least 100.

10. The light control film of claim 1 wherein the absorptive regions have an average pitch of 10 to 100 microns.

11. The light control film of claim 1 wherein the absorptive regions comprise an organic light absorbing material.

12. The light control film of claim 1 wherein the absorptive regions comprise carbon black.

13. The light control film of claim 1 wherein the absorptive regions comprise polyelectrolytes.

14. The light control film of claim 1 wherein the absorptive regions comprise a non-metallic light absorbing material.

15. The light control film of claim 1 wherein the absorptive regions comprise bilayers in the form of a polyelectric stack comprising an organic polymeric polyion and counterion comprising a light absorbing material.

16. The light control film of claim 1 wherein the absorptive regions comprise a layer-by-layer light absorptive coating.

17. The light control film of claim 1 wherein the alternating transmissive regions are integral with a land region.

18. The light control film of claim 1 wherein the absorptive regions comprise a core sandwiched between cladding layers.

19. A method of making a light control film comprising:
providing a microstructured film comprising a bottom surface and a microstructured surface opposite the bottom surface and a plurality of light transmissive regions alternated with channels, each of the light transmissive regions defined by a top surface and first and second sidewalls, the channels comprising bottom surfaces opposite the top surfaces of the light transmissive regions, wherein each of the first sidewalls has a wall angle with a line that is perpendicular to the light output surface from +1 degree to +10 degrees or from −1 degree to −10 degrees;

applying an organic light absorptive material to the microstructured surface; and removing the applied light absorptive material from the top surfaces, the bottom surfaces and only first sidewall or the second sidewalls.

* * * * *

UNITED STATES PATENT AND TRADEMARK OFFICE
CERTIFICATE OF CORRECTION

| | |
|---|---|
| PATENT NO. | : 12,320,993 B2 |
| APPLICATION NO. | : 17/596301 |
| DATED | : June 3, 2025 |
| INVENTOR(S) | : Raymond J Kenney et al. |

Page 1 of 1

It is certified that error appears in the above-identified patent and that said Letters Patent is hereby corrected as shown below:

In the Claims

Column 21
Line 4-5, In Claim 19, delete "only first sidewall or the second sidewalls" and insert -- only the second sidewalls --, therefor.

Signed and Sealed this
Ninth Day of December, 2025

John A. Squires
*Director of the United States Patent and Trademark Office*